United States Patent [19]
Forest et al.

[11] Patent Number: 5,682,771
[45] Date of Patent: Nov. 4, 1997

[54] KNITTED COVER

[75] Inventors: Daniel J. Forest, Macomb, Mich.; Gerald Francis Day, Derbyshire, United Kingdom; Giles Timothy Gregory, Nottinghamshire, United Kingdom; Malcolm Frederick Proctor, Nottingham, United Kingdom; William E. Girard, Ontario, Canada

[73] Assignee: General Motors Corporation, Detroit, Mich.

[21] Appl. No.: 615,851

[22] Filed: Mar. 12, 1996

[51] Int. Cl.6 ............................................ D04B 1/22
[52] U.S. Cl. ............................... 66/198; 66/169 R
[58] Field of Search ........................ 66/170, 171, 196, 66/198, 202

[56] References Cited

U.S. PATENT DOCUMENTS

| | | | |
|---|---|---|---|
| Re. 26,667 | 9/1969 | Sarbo | 66/171 |
| 3,293,662 | 12/1966 | Seiler | 66/171 X |
| 3,531,952 | 10/1970 | Chesebro, Jr. | 66/171 |
| 3,759,070 | 9/1973 | Mutze et al. | 66/202 X |
| 3,985,003 | 10/1976 | Reed | 66/171 X |
| 4,038,840 | 8/1977 | Castello | 66/170 |
| 4,624,115 | 11/1986 | Safrit et al. | 66/198 X |
| 5,209,084 | 5/1993 | Robinson et al. | 66/196 |
| 5,213,863 | 5/1993 | Day et al. | 66/196 X |
| 5,235,826 | 8/1993 | Brooks et al. | 66/202 X |
| 5,308,141 | 5/1994 | Robinson et al. | 297/218 |
| 5,326,150 | 7/1994 | Robinson et al. | 297/218 |

FOREIGN PATENT DOCUMENTS 0 627 516 A1  12/1994  European Pat. Off.
2 299 592 A  10/1996  United Kingdom.

*Primary Examiner*—John J. Calvert
*Attorney, Agent, or Firm*—George A. Grove

[57] ABSTRACT

A knitted fabric cover, especially for a vehicle seat having a vehicle air bag housed therein, in which the cover is adapted to provide minimal hindrance to inflation of the air bag by having at least one line of weakness knitted into the cover, in particular in a coursewise direction.

21 Claims, 3 Drawing Sheets

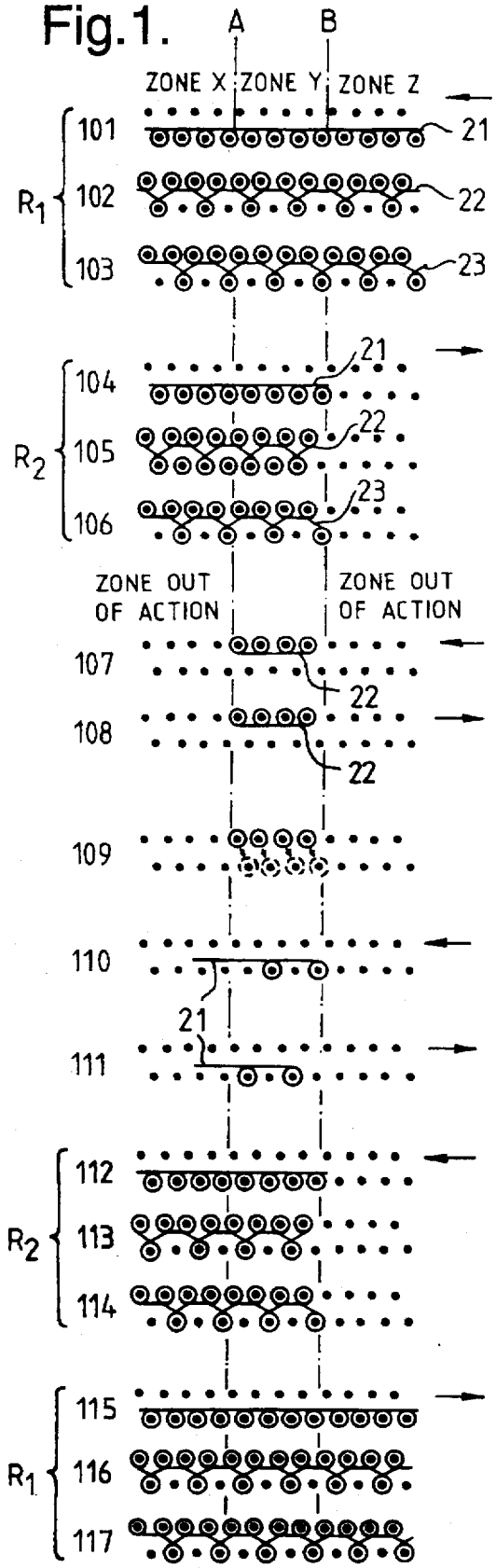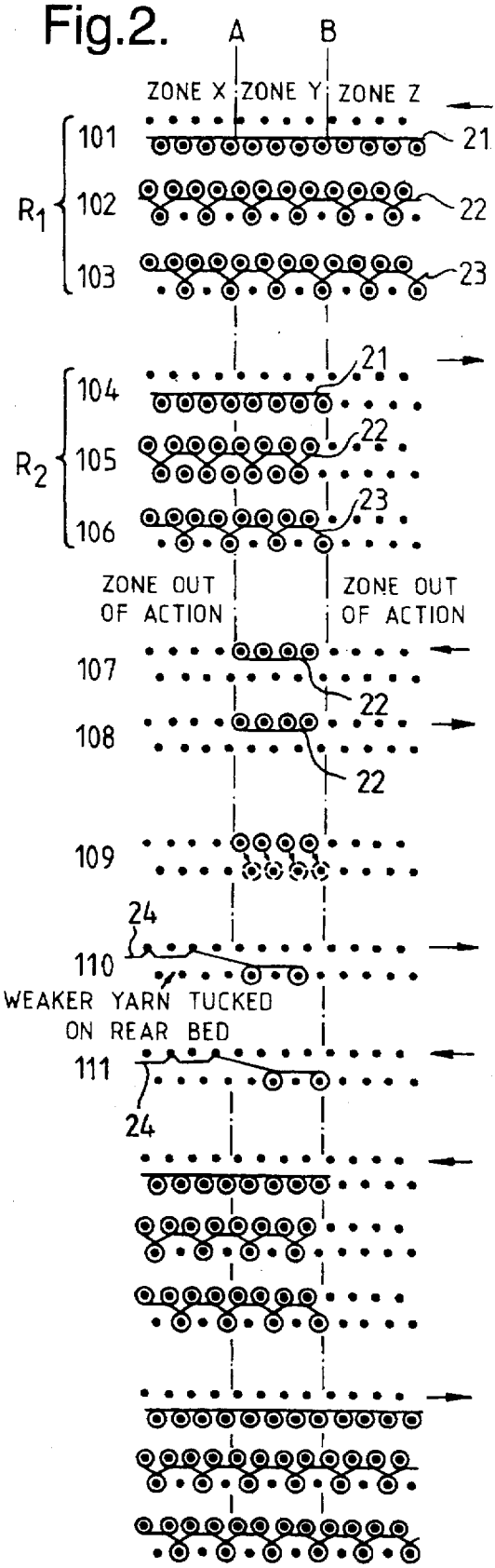

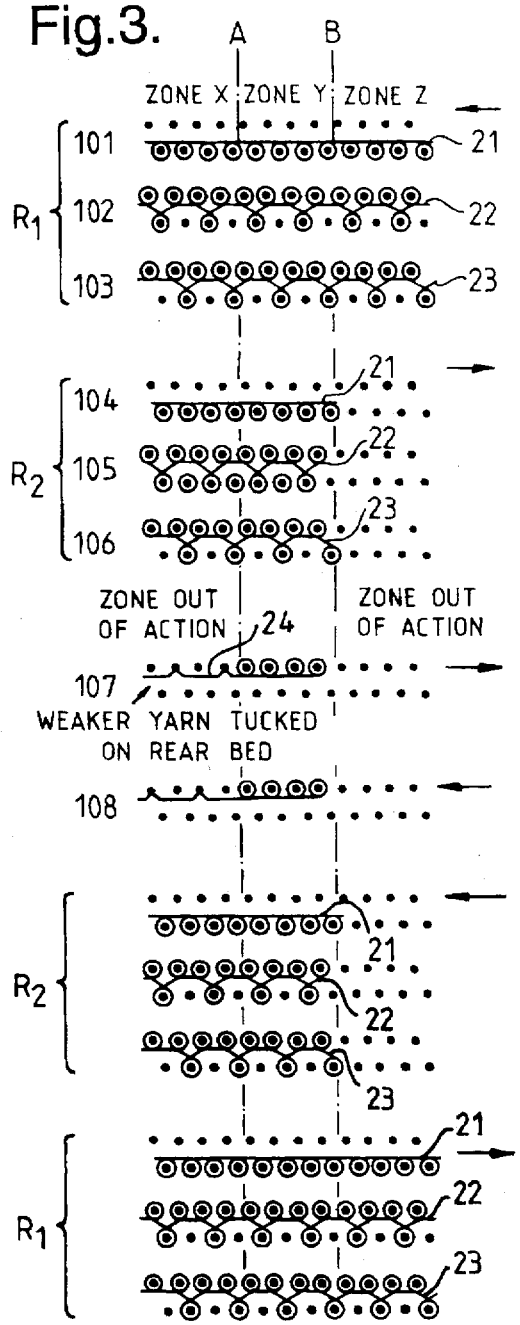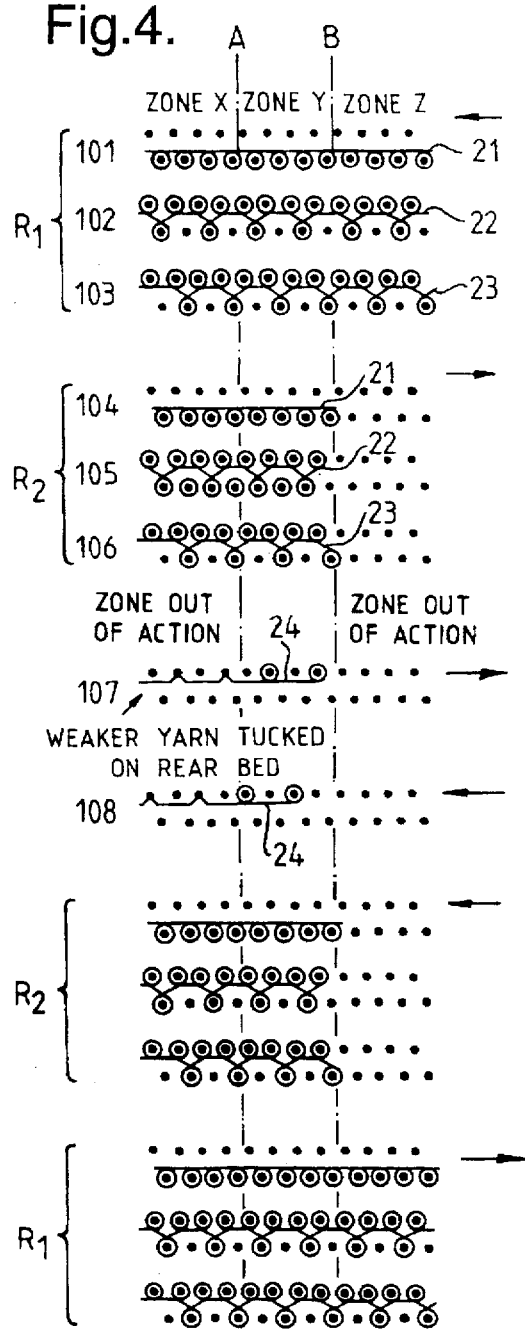

KNITTED COVER

FIELD OF THE INVENTION

This invention relates to knitted fabric covers and in particular to knitted covers used in automobile trim.

BACKGROUND OF THE INVENTION

The invention is useful in machine knitting on weft knitting machines having independently operable needles arranged in two needle beds, for example, a flat "V" bed machine producing mainly double jersey structure fabric.

It has recently been found possible to knit one-piece upholstery covers for covering three-dimensional objects which removes the need for sewing portions of the covers together. In U.S. Pat. Nos. 5,308,141 and 5,326,150, a method is disclosed for knitting one-piece covers for the base and/or back cushions of a motor vehicle seat.

Motor vehicles, in particular motor cars, are now commonly provided with air bag restraint to prevent vehicle passengers or drivers from injury during a collision. Some vehicles are now being provided with side collision air bags, which in their stand-by condition may be housed within a vehicle seat back or base.

On conventional seats when the air bag is activated and inflates, it escapes through the seat covers by bursting through the sewn seams where the portions of the cover are sewn together.

With 3D knitted seat covers, the covers are completely homogeneous, and there may be a slight time delay before the air bag bursts through the cover. Furthermore, since the material is homogeneous, the location of the burst is not fully predictable.

An object of the invention is to provide a knitted cover which can split or burst in a predicted manner,

SUMMARY OF THE INVENTION

According to the present invention, there is provided a knitted fabric cover for an object, the cover having a line of weakness knitted into the knitted fabric, preferably in a coursewise direction.

Preferably the cover fabric is a weft knitted double jersey fabric having a back layer with a technical back face and a front layer with a technical front face. Preferably the line of weakness comprises at least one portion of at least one course of knitting which is of a single jersey construction.

For a seat cover, it is preferable to form the line of weakness so that it is not visible on the from face of the cover, and therefore the single jersey course or courses is/are formed in the front layer of the fabric.

Alternatively, the cover has a knitted course which at least in part is formed from a yarn which is weaker than the ground yarn from which that layer of the cover fabric is formed.

Preferably the line of weakness comprises at least a portion of at least one course in the back layer which is formed at least in part of a yarn which is weaker than the ground yarn(s) from which both the back layer and front layer are formed.

Alternatively, the front layer of the double jersey fabric is knitted from a weakened yarn, and the front and back layers of the fabric are interconnected by an interlock structure of weakened yarn formed on alternate stitches in the front and back layers.

Such a cover can be made by three-dimensional knitting and is suitable for use in motor vehicle trim and in particular for the use as motor vehicle seat covers.

The invention also provides for a method of forming a weakened line in a knitted fabric cover wherein the knitted fabric is knitted so that at least a portion, preferably a portion of at least one course, of the fabric is made weaker than the surrounding knitted fabric.

Preferably the fabric is a weft knitted double jersey fabric knitted on a weft knitting machine having needles arranged in two independently operable needle beds. The fabric has a front layer knitted on one needle bed and a back layer knitted on a second needle bed. The fabric is knitted on both needle beds in a mainly double jersey construction, and at a predetermined course said portion is made weaker by several different methods.

Said portion is made weaker by removing stitches from at least some of the needles of the second needle bed while said one needle bed continues to knit for a further two to six courses and thereafter recommencing knitting on both needle beds to continue the double jersey construction.

The stitches can be transferred to needles in said one needle bed. Alternatively, the stitches on some or all of the needles on the second needle bed may be pressed off and preferably the edge is sealed by a fusible thread.

Alternatively, said portion is made weaker by holding up the needles on said one needle bed while some or all of the needles of the second needle bed continue to knit using a weaker yarn than the ground yarn for between one to four courses, and thereafter knitting of the double jersey construction continues on both needle beds.

In another alternative, the ground yarn is knitted only on selected needles in both needle beds, and a yarn weaker than the ground yarn is knitted onto the other needles for at least one further course, and preferably no more than a further four courses, and thereafter the ground yarn is knitted on all needles in both needle beds.

In yet another method where the front layer of the double jersey fabric is made from at least one ground yarn and the back layer of the fabric is made from a lower strength ground yarn which is weaker than the first ground yarn, said portion is made weaker by knitting the lower strength ground yarn on selected needles on said one needle bed and on the second needle bed for at least one course, and preferably on alternate needles on two courses.

In a further method, a low strength yarn is knitted on the needles of the second needle bed for at least one course while said one needle bed continues to knit the front layer. The weaker yarn is then pressed off, and preferably sealed with a fusible thread, and the double jersey construction knitting continues on both needle beds thereafter.

Preferably the knitted double jersey fabric has its front layer formed from a chenille yarn and its back layer formed from a polyester yarn. The chenille yarn may be of the type disclosed in the applicant's Published Application EP-A627, 516. The chenille yarn may have a decitex in the range 1500 to 3000. Conveniently, the fabric has 8 to 16 wales per inch (2.54 cm) in a course-wise direction, and in the range 8 to 30 courses per inch in the wale-wise direction. The chenille yarn is knitted into the fabric as knitted looped stitches.

The polyester yarn is preferably an air-textured polyester yarn having a decitex in the region of 550 to 900, or 600 to 800, or 600 to 750, or 650 to 700 decitex. The chenille yarn may be formed of a pair of twisted nylon and/or polyester strands, for example by the use of a low-melting point nylon strand, or the pile may be moveable relative to the strands.

The chenille yarn may have a count in the range 1500 to 3000 decitex. The chenille yarn is preferably one having moveable pile and/or an extensible core.

Preferably, the air textured polyester yarns are continuous filaments yarns having a count, in the unrelaxed state, of 680 to 750 decitex.

Preferably, the method of knitting is such that, in the relaxed state, the fabric has from 4 to 6 wales per cm.

The fabric may be knitted on a flat bed knitting machine having a pair of opposed needle beds. The machine may have a gauge in the range 10 to 16, preferably 10 to 14, further preferably 12.

The machine may be a double system machine or a triple system or four system machine.

The present invention preferably provides a method of knitting a cover, preferably an upholstery fabric, in which the knitting is carried out on a machine having a pair of opposed independently operable needle-beds, and in which the needles in each bed can be moved independently of one another in that bed into the path of an operating cam box reciprocating along the needle beds.

An upholstery fabric for a vehicle seat preferably has a weight in the relaxed state ready for use in excess of 500 g/m$^2$, preferably 500 to 900 g/m $^2$. This compares to traditional knitted products which have a weight of 300 to 350 g/m $^2$.

Preferably, the upholstery fabric is a weft knitted upholstery fabric formed of yarn having a decitex in the range 625 to 850 and having been knitted on a machine having a machine gauge in the range 10 to 18, the fabric being of generally double jersey construction having interengaging loops between the two layers of the double jersey structure.

The knitted fabric may be a three-dimensional cover for use on a three-dimensional structure to form an upholstered structure. The fabric may be formed of two or more different colored ground yarns.

Also according to the present invention, there is provided a method of allowing with minimal hindrance the inflation of an air bag housed within a vehicle trim component having a cover, typically a vehicle seat cushion, wherein the component is covered with a knitted fabric cover having a coursewise line of weakness knitted into the knitted cover allowing inflation of the air bag with minimal hindrance from the cover. Preferably, the weakness is made substantially invisible externally of the cover.

BRIEF DESCRIPTION OF THE DRAWINGS

The invention will be described by way of example and with reference to the accompanying drawings in which:

FIG. 1 is a knitting diagram of a first embodiment of the invention,

FIG. 2 is a second knitting diagram of a second embodiment of the invention,

FIG. 3 is a third diagram of a third embodiment of the invention,

FIG. 4 is a fourth knitted diagram of a fourth embodiment of the invention,

DESCRIPTION OF PREFERRED EMBODIMENTS

In order that the invention can be fully understood, reference will be made to a flat V-bed knitting machine.

More details on such knitting machines are to be found in the publication "Dubied Knitting Manual", published by Edouard Dubied et Cie SA, Neu Chatel, Switzerland in 1967. Flat V-bed knitting machine are very well known and many such machines are now computer controlled. It has been proposed recently to manufacture upholstery fabric on such flat V-bed knitting machines and proposals have been made (see, for example, U.S. Pat. No. 5,308,141 and U.S. Pat. No. 5,326,150) to knit upholstery fabric suitable for use in vehicles.

The knitting of a fabric cover by the method according to the invention uses a Stohl CMS machine with 12 gauge needles. This machine is a flat V-bed machine of the type provided with presser foot means to assist take-down of the knitted fabric. The machine can operate with a plurality of yarn supplied, each of which is associated with a respective cam box.

The cam box traverses across the needle beds supplying yarn to the needles as desired in each direction of travel.

Figure 7:
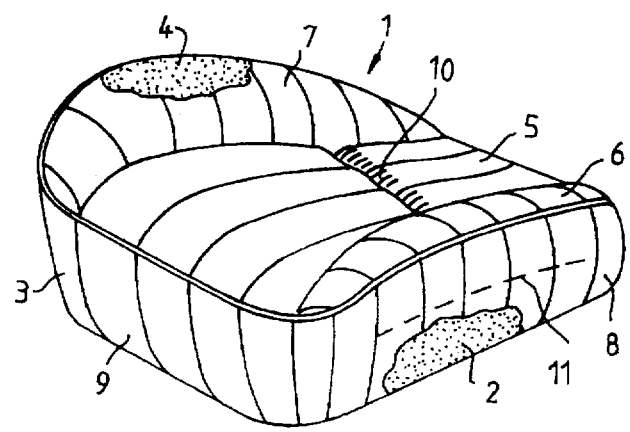
FIG. 7 is an isometric view of a vehicle seat cushion.

Referring to FIG. 7, there is shown an upholstered seat cushion or squab generally indicated by 1. The seat cushion is formed by the covering of a core 2 normally in the form of semi-rigid foam supported on a frame, with a fabric cover generally indicated by 3. The core is shaped so as to provide wings 4 or any other desired shape in the seat.

Such seats have particular application in vehicles but may be used in numerous other applications. When used in motor cars, the seat frame may support an air bag inflation mechanism which is operated by side collisions.

Stretched over the core 2 is a fabric cover 5, which is provided with a main body portion covering the seat with integral wing portions 6,7 and side portions such as portion 8. There is also a from portion 9. The fabric cover is folded over the base of the seat squab and may be secured in a manner known. The seat may have indentations 10 formed therein in order to create aesthetic effects.

Such seat structures are described in U.S. Pat. Nos. 5,308,141 and 5,326,150. In those patents, there is described a three-dimensional knitted fabric upholstery cover which is knitted in a single operation. In the present invention, the fabric cover 5 is stretched over the core 2. In order to aid or control the bursting of the air bag through the otherwise homogeneous knitted cover 5, the cover is provided with a line of weakness 11 extending in a course-wise direction relative to the direction of knitting. A course-wise direction is the direction in the fabric extending at right angles to the selvage.

Referring to FIG. 1, there is shown a stitch diagram in which each row labeled 101–117 represents a row of knitting, each using a different yarn on one pass of the yarn carrier for a three system machine. A three system machine has a cam box which can carry up to three yarn carriers on a pass across the needle beds. In each row, such as row 101, the upper line of small dots represents individual needles on the rear bed of the knitting machine, and the lower row of dots represents the from bed of the knitting machine. In the terminology used herein, the front face of the fabric is knitted on the from bed of needles and the rear face is knitted on the rear needle bed. The yarn is represented by loops and interconnecting cross-links.

The zones X and Z outside of the lines A and B represent a double jersey structure knitted from a chenille yarn according to European Patent Application EP-A- 0627,516. Zone Y between the lines A and B is where the course-wise line of weakness 11 is formed.

On the first pass of the yarn carriers on the knitting machine from right to left, a chenille yarn 21 is knitted on all needles on the front bed. There is no difference between the zones. A first contrast yarn 22 is knitted on alternate needles on the front bed and all the needles of the rear bed (row 102) with interconnecting loops between the yarn knitted on the front and rear beds. A second contrast yarn 23 is knitted on the other respective alternate needles in the front bed and all the needles on the rear bed with interconnecting loops between the yarn knitted on the two beds (see row 103). The three rows 101–103 make up a repeat unit ($R_1$). The relationship between the contrast yarns 22, 23 in the from needle bed is determined by the required pattern on the front face of the fabric. On the next pass of the yarn carriers from left to right, the needles in zone Z are put out of action and the yarns 21–23 knit as before, forming the second repeat unit $R_2$.

On the next pass of cam box, the yarn carrier for the first contrast yarn 22 only knitting from right to left, zones X and Z are put out of action, with the first contrast yarn 22 being knitted only in zone Y on the rear needle bed (row 107). This is repeated in the next pass of that yarn carrier, from left to right (row 108). These two courses may be termed "reparation courses". The loops are then transferred to the front needle bed (row 109). The chenille yarn 21 is then knitted on alternate needles in zone Y as its yarn carrier passes from right to left (row 110) and then from left to right (row 111) knitting on alternate needles in each pass.

On the next pass, all three yarn carriers move from right to left to repeat the repeat unit $R_2$ with rows 112–114. Finally on the next pass, all the yarn carriers pass from left to right, forming the repeat unit $R_1$ with rows 115–117, which forms part of the main jacquard material.

Thus, a weakness is created in zone Y adjacent to the transfer of the stitches from the rear bed to the front bed when the subsequent two rows 110,111 form a course of single jersey fabric.

In FIG. 2, there is illustrated a second embodiment of the invention, and the same reference numbers will be used in this figure and subsequent figures as was used with respect to FIG. 1.

The first four passes of the cam box right to left and left to right are identical to those described with reference to FIG. 1, forming the repeat units $R_1$ and $R_2$ and the two preparation courses 107, 108.

The loops are then transferred from the rear needle bed to the front needle bed at row 109. Alternatively, these stitches could be pressed off, especially if the first contrast yarn 22 was replaced by a fusible thread.

A weaker yarn 24 is then carried across the zone X by float stitches and tuck stitches and knitted on alternate needles on the front needle bed in zone Y in two passes of its respective yarn carrier (rows 110, 111) from left to right and then right to left.

The two repeat units $R_2$ and $R_1$ are then knitted as previously described with reference to FIG. 1.

The weaker yarn 24 on the front bed provides for a weakened line extending in a coursewise direction in a single course of fabric.

The chenille yarn 21 will have a yarn count of about 2000 decitex. The contrast yarns 22 and 23 are preferably polyester yarns with a count of about 900 decitex, whereas the weakened yarn 24 will have a count of about 200 decitex. The weakened yarn could be a bicomponent fusible yarn called Grillon Yarn or a three component yarn comprising nylon 11, acrylic and polyester fibers.

Referring to FIG. 3, there is shown yet another method of forming a weakened course. The first two passes of the yarn carrier right to left and left to right form the repeat units $R_1$ and $R_2$.

A weaker yarn 24 is then carried across zone X by float stitches and tuck stitches until it is knitted in zone Y on the rear needle bed on all needles in zone Y, on both passes of the yarn carrier, from left to right and right to left (rows 107 and 108). The repeat units $R_2$ and $R_1$ are then produced as previously described.

Thus in this embodiment, the weaker yarn 24 forms two weakened courses in the back layer of the double jersey material.

Referring to FIG. 4, the embodiment shown therein is very similar to that shown in FIG. 3 except that in rows 107 and 108, the weaker yarn 24 is knitted on alternate needles on the rear needle bed on the two passes of its respective yarn carrier, thus forming only a single course of weakened yarn knitted on the rear bed.

Figure 5:
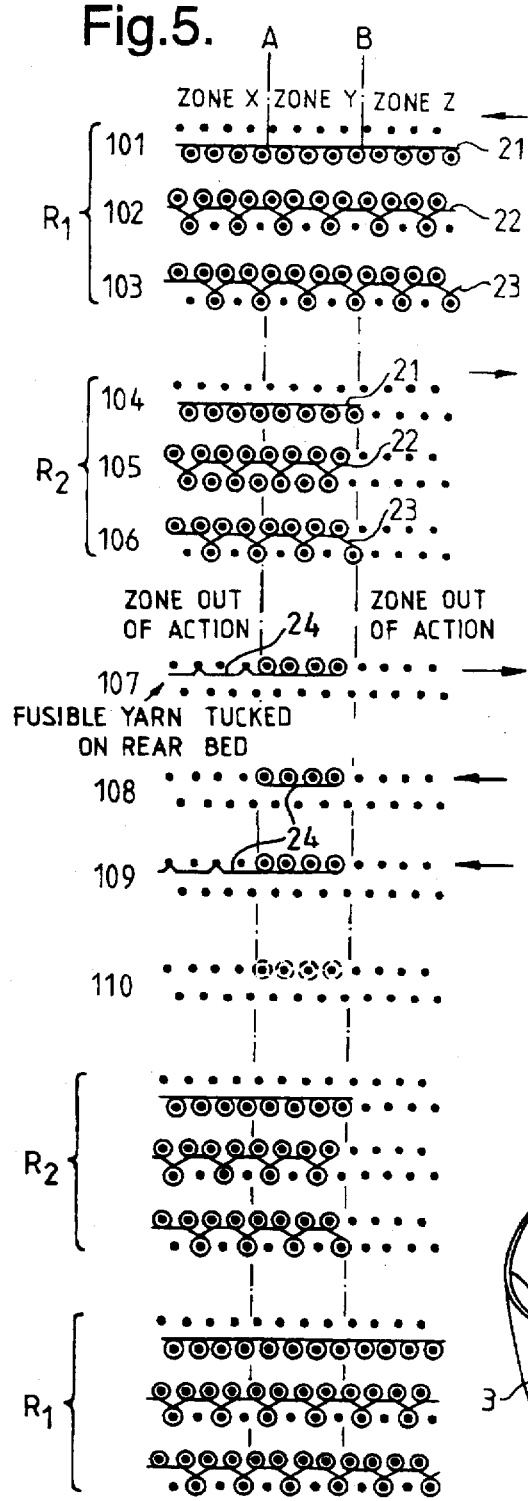
FIG. 5 is a fifth pattern of a fifth embodiment of the invention.

Referring to FIG. 5, again the repeat units $R_1$ and $R_2$ are knitted as before. At row 107 the weakened yarn 24, in this case a fusible yarn, is floated and tucked across zone X to be knitted on the rear needle bed in zone Y. Several courses of fusible yarn are knitted in zone Y. This is represented by row 108 only. At least two, and preferably four or six, rows of fusible yarn are knitted. Then the yarn carrier takes the fusible yarn back across zone X by float stitches and tuck stitches as shown in row 109. The fusible yarn 24 in zone Y is then pressed off the rear bead needles (row 110). The repeat units $R_2$ and $R_1$ are then knitted as before.

The courses of weakened fusible yarn on the rear needle bed again form a weakened single jersey construction area in the fabric formed the rear needle bed.

Figure 6:
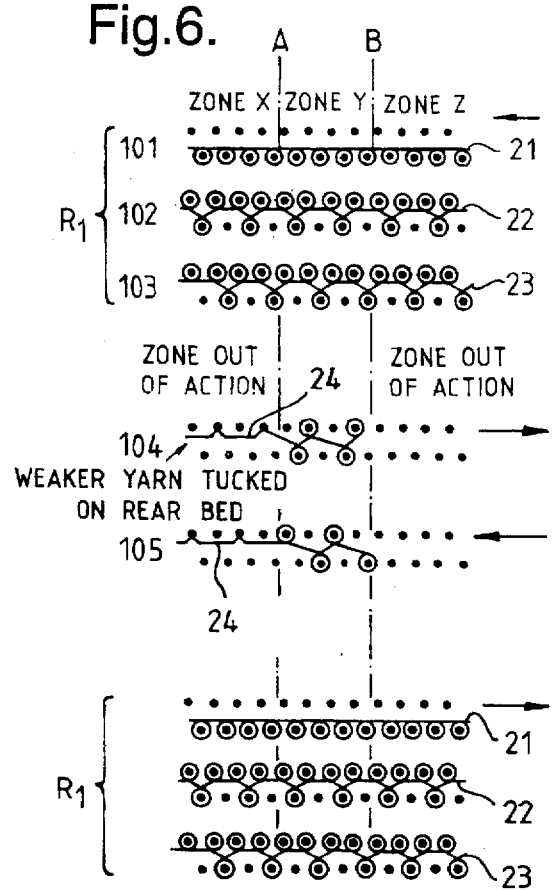
FIG. 6 is a sixth knitting diagram of a sixth embodiment of the invention.

Referring to FIG. 6, a weakened line in zone Y is created by bringing in the weakened yarn 24 after repeat unit $R_1$ and then knitting a course of standard interlock construction using the weakened yarn in two passes of the yarn carrier to form rows 104, 105. The interlock course of weakened yarn provides a weakened coursewise extending line of stitches.

What is claimed is:

1. A one-piece knitted fabric cover for an object wherein the cover fabric is a weft knitted double jersey fabric having a back layer with a technical back face and a front layer with a technical front face, the cover having a line of weakness knitted into the knitted fabric, wherein the line of weakness comprises at least one portion of at least one course of knitting which is of a single jersey construction.

2. A cover as claimed in claim 1 wherein the single jersey course or courses is formed in the front layer.

3. A knitted cover as claimed in claim 1 wherein a course of the knitted fabric, at least in part, is formed from a yarn which is weaker than the ground yarn from which that layer of the cover is formed.

4. A knitted cover as claimed in claim 3 wherein at least said portion of said one course is formed in the front layer of a yarn which is weaker than the ground yarn(s) from which the front layer and rear layer are formed.

5. A knitted cover as claimed in claim 1 wherein the line of weakness comprises at least a portion of at least one course in the back layer which is formed at least in part of a yarn which is weaker than the ground yarn(s) from which both the back layer and front layer are formed.

6. A knitted cover as claimed in claim 5 wherein all the stitches in the weakened portion of said course are formed from the weaker yarn.

7. A knitted cover as claimed in claim 5 wherein selected stitches in said course are formed from the weaker yarn.

8. A method of forming a weakened line in a one-piece knitted fabric cover so that at least a portion of the fabric is made weaker than the surrounding knitted fabric, and said weaker portion comprises a portion of at least one course of the fabric, said method comprising knitting a weft knitted double jersey fabric, knitted from at least one ground yarn, on a weft knitting machine having needles arranged in two independently operable needle beds, the fabric having a front layer knitted on one needle bed and a back layer knitted on a second needle bed wherein the fabric is knitted on both needle beds in mainly double jersey construction and at a predetermined course said weaker portion is formed in at least one of the two layers by knitting a course having a weaker construction than said double jersey construction.

9. A method as claimed in claim 8 comprising, at said predetermined course, said portion is made weaker by holding up the needles on said one needle bed while continuing to knit with some or all of the needles of the second needle bed and using a weaker yarn for between two to six courses, and thereafter continuing knitting of the double jersey construction on both needle beds.

10. A method as claimed in claim 9 comprising forming said weakened portion by knitting with the weaker yarn on selected needles on the second needle bed, and outside of the weakened portion engaging the weaker yarn as float and tuck stitches on spaced apart selected needles on the second needle bed.

11. A method as claimed in claim 10 comprising forming said weakened portion by kitting with the weaker yarn on all needles on the second needle bed that extend for the coursewise length of the weakened portion.

12. A method as claimed in claim 11 comprising knitting with the weaker yarn for one course only and knitting on alternate needles for one pass of the yarn in one direction, and on the intervening needles on the return pass of the weaker yarn.

13. A method as claimed in claim 8 comprising, at the predetermined course, said portion is made weaker by knitting the ground yarn only on selected needles in both needle beds, and knitting with a yarn weaker than the ground yarn onto the other needles for at least one further course, and thereafter knitting with the ground yarn on all needles on both needle beds.

14. A method as claimed in claim 12 comprising forming the weakened portion by knitting with the weaker yarn on all the needles on the second needle bed.

15. A method as claimed in claim 8 comprising knitting the front layer of said fabric on one needle bed using a first ground yarn, and knitting the back layer on the second needle bed using a lower strength ground yarn which is weaker than the first ground yarn wherein the fabric is knitted in a mainly double jersey construction up to a predetermined course and at that predetermined course said portion is made weaker by knitting with the lower strength ground yarn on selected needles on said one needle bed and the second needle bed for at least one course, and thereafter continuing to knit with the second ground yarn fed to the second needle bed only.

16. A method as claimed in claim 8 comprising, at said predetermined course, said portion is weakened by knitting a low strength yarn on the needles on the second needle bed for at least one course while continuing to knit on said one needle bed with its respective ground yarn and then pressing off the weaker yarn and continuing double jersey knitting on both needle beds.

17. A method as claimed in claim 8 wherein at said predetermined course said portion is made weaker by removing stitches from at least some of the needles of the second needle bed, while said one needle bed continues to knit for a further one to four courses, and thereafter knitting recommences on both needle beds to continue the double jersey construction.

18. A knitted cover for an object wherein the cover fabric is a weft knitted double jersey fabric having a back layer with a technical back face and a front layer with a technical front face, the cover having a line of weakness knitted into the fabric wherein at least one course of the double jersey fabric is knitted from a weakened yarn, and the front and back layers of the fabric are interconnected by an interlock structure of weakened yarn formed on alternate stitches in the front and back layers.

19. A method as claimed in claim 18 comprising, at said predetermined course, transferring stitches on said at least some needles of the second needle bed to needles in said one needle bed.

20. A method as claimed in claim 18 comprising, at said predetermined course, pressing off stitches on said at least some needles of the second needle bed to form a pressed-off edge and sealing the pressed-off edge with a fusible thread.

21. A method as claimed in claim 18 comprising knitting the further one to four courses using a weaker yarn than a said ground yarn used for the double jersey construction fabric.

* * * * *